Nov. 9, 1965  F. GERZON  3,216,662
DEVICE FOR REGULATING THE TEMPERATURE OF AN ENCLOSURE
HEATED BY A CENTRAL HEATING SYSTEM
Filed March 20, 1962  2 Sheets-Sheet 1

INVENTOR
FRITS GERZON
BY
AGENT

Nov. 9, 1965    F. GERZON    3,216,662
DEVICE FOR REGULATING THE TEMPERATURE OF AN ENCLOSURE
HEATED BY A CENTRAL HEATING SYSTEM
Filed March 20, 1962    2 Sheets-Sheet 2

INVENTOR
FRITS GERZON
BY
AGENT

United States Patent Office 3,216,662
Patented Nov. 9, 1965

3,216,662
DEVICE FOR REGULATING THE TEMPERATURE OF AN ENCLOSURE HEATED BY A CENTRAL HEATING SYSTEM
Frits Gerzon, Emmasingel, Eindhoven, Netherlands, assignor to North American Philips Company, Inc., New York, N.Y., a corporation of Delaware
Filed Mar. 20, 1962, Ser. No. 181,073
Claims priority, application Netherlands, Jan. 19, 1962, 273,757
16 Claims. (Cl. 236—9)

The invention relates to a device for regulating the temperature of an enclosure heated by a central heating system with the use of a regulating member controlled by a bridge circuit having two main arms each comprising the series combination of an ohmic resistor and a temperature dependent resistor and connected between two conductors connected to a supply voltage source.

In many temperature regulating devices of the kind set forth above, a first adjustable thermostat measuring the temperature of the water in a boiler is mounted on the boiler.

A second thermostat is disposed in the enclosure to be heated and measures the temperature thereof. If the enclosure heated by the central heating system is, for example, a dwelling house, the second thermostat may be disposed in a suitable room of the house.

The thermostats each operate a switch. If either the temperature of the water in the boiler or the temperature in the said room exceeds the temperatures to which the boiler thermostat and the room thermostat are set, the respective switch is opened and hence the system is switched off.

If one of the two temperatures falls below the adjusted value, the respective switch is closed, and when both switches have been closed the system is switched on again.

The room thermostat as a rule comprises a bimetal element on which a mercury switch is mounted. This mercury switch is closed when the temperature in the room falls below, and is opened when this temperature rises above, the pre-set value.

The bimetal element is slow-acting and furthermore it takes some time for the air in the room to reach the required temperature.

Hence when the boiler thermostat is set to a high temperature, the temperature in the said room and consequently in the remaining rooms of the house to be heated may fluctuate widely about a mean value.

Let it be assumed, for example, that the room temperature is set to 20° C. and that the atmospheric temperature is such that the temperature of the water in the boiler must be about 50° C. to maintain a room temperature of 20° C. If, now, the boiler thermostat is set to 80° C., on switching on the system the boiler temperature will rise to exceed 50° C., that is to say to 80° C., because it takes some time before the room thermostat reaches 20° C.

Consequently the boiler water is too hot and the temperature in the said room will rise above 20° C., for example, to 25° C.

The boiler water then cools down but owing to the above mentioned slowness the temperature of the water will drop too far, for example, to 40° C. or 35° C., so that the room temperature falls below 20° C. before the room thermostat again indicates 20° C. and switches on the heating system by closing the mercury switch.

This temperature variation is undesirable since it involves large temperature fluctuations. Thus, the temperature prevailing in the house is never uniform but now it is too high and then too low. Although this phenomenon occurs particularly when the system is first switched on, it may also be produced by external disturbances, for example, by opening a door or window so that a large amount of cold air is admitted.

The peaks of this heat variation may be limited by setting the boiler thermostat to not too high a temperature. However, this requires the operation of two thermostats and further the boiler temperature required to maintain a desired temperature in the house at a particular atmospheric temperature is to be estimated each time.

It is an object of the present invention to obviate these disadvantages. For this purpose the device in accordance with the invention comprises a bridge circuit having two main arms each comprising, in series, a temperature dependent resistor and a normal ohmic resistor, and is characterized in that the free ends of the temperature-dependent resistors in the main arms are connected to the same conductor. There is connected between the junction points of the ohmic resistor and the temperature dependent resistor of the two main arms a diagonal arm comprising the series combination of an ohmic resistor and a further temperature-dependent resistor. A regulating member is connected between a point of the diagonal arm and one of the two conductors. The first temperature-dependent resistor $R_B$ depends on the temperature $T_B$ outside the heated enclosure. the second temperature-dependent resistor $R_K$ depends on the temperature $T_K$ within the heated enclosure and the third temperature-dependent resistor $R_I$ depends on the temperature $T_I$ of the water heated by the system.

In order that the invention may readily be carried into effect, embodiments thereof will now be described, by way of example, with reference to the accompanying diagrammatic drawings, in which.

Figure 1:
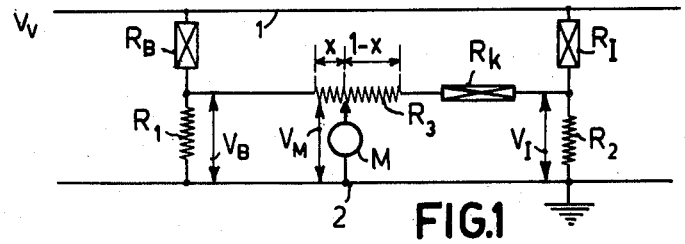
FIGURE 1 is a circuit diagram of a bridge arrangement including three resistors having negative temperature coefficients (N.T.C. resistors).

In FIGURE 1 a N.T.C. resistor $R_B$ is disposed at a suitable (shaded) point outside the heated enclosure so that its resistance value depends upon the atmosphere temperature $T_B$. A resistor $R_I$ which also is a N.T.C. resistor measures either the temperature $T_I$ of the water in the boiler or the temperature $T_I$ of a suitable radiator (for example, a radiator in a dwelling room). A third N.T.C. resistor $R_K$ is disposed in a room (for example, likewise a dwelling room) so that its resistance value depends upon the room temperature $T_K$. The said three N.T.C. resistors are connected in a bridge circuit which is connected between two conductors 1 and 2 between which a supply voltage of $V_V$ volts is set up, the conductor 2 being connected to earth.

In the bridge circuit shown in FIGURE 1, the resistor $R_B$ is connected in series with a first resistor $R_1$, and the resistor $R_I$ is connected in series with a second resistor $R_2$. These four resistors together constitute the two main arms of the bridge circuit. The diagonal arm of the bridge circuit is constituted by the series combination of the resistor $R_K$ and a resistor $R_3$. The resistor $R_3$ has a variable tapping. As is shown in FIGURE 1, the resistor $R_3$ is divided by the variable tapping into a part having a resistance value $R_3.x$ and into a part having a resistance value $R_3 (1-x)$.

It must be ensured that the resistance value of the series-connected resistors $R_K$ and $R_3$ always is large compared with the resistance value of the resistors $R_1$ and $R_2$. Thus, there will flow through the diagonal arm a current which under all conditions is small compared with the current flowing through the series combination of the resistors $R_1$ and $R_2$. Hence, the voltage $V_B$ across the resistor $R_1$ depends only upon the resistance value of the resistor $R_B$ and consequently on the atmospheric temperature $T_B$. The voltage $V_I$ across the resistor $R_2$ depends only on the resistance value of the resistor $R_I$ and hence on the temperature $T_I$.

Between the variable tapping on the resistor $R_3$ and the conductor 2 there is connected a regulating member M which is controlled by a voltage $V_M$ set up between the variable tapping and the conductor 2. The voltage $V_M$ may be written:

$$V_M = \frac{V_B(R_3(1-x)+R_K)+V_I \cdot R_3 x}{R_3+R_K} \quad (1)$$

When the atmospheric temperature $T_B$ falls, the voltage $V_B$ decreases since the resistance value of the resistor $R_B$ is increased. From Formula 1 it follows that as a result the voltage $V_M$ is decreased until a switch included in the regulating member is closed and the central heating system is switched on.

This heating system causes the temperatures $T_I$ of the boiler water to rise so that the resistance value of $R_I$ decreases and hence the voltage $V_I$ increases. This causes the voltage $V_M$ to rise until the switch included in the regulating member M is opened so that the heating system is switched off. If subsequently the temperature $T_I$ of the water in the boiler decreases, $V_I$ falls off so that the heating system is again switched on, and so on.

The resistance $R_I$ is included in the bridge circuit substantially to safeguard the system. The resistance $R_B$ is included to render available additional information so that when the system is started the temperature $T_K$ of the enclosure to be heated may rapidly rise without the adjustment of the regulating member M having to be altered.

The resistor $R_K$ must also take part in the regulating process since otherwise changes within or without the enclosure to be heated which are not determined by the atmospheric temperature $T_B$ are not allowed for. If, for example, there is no wind the water in the boiler need not be as hot to maintain a certain temperature $T_K$ as when there is a strong wind. Hence in order to enable the temperature $T_K$ to be measured in the embodiment of FIGURE 1 the resistor $R_K$ is included in the diagonal arm. To show the influence of the resistor $R_K$ in the bridge circuit it is assumed for the sake of simplicity that $x=1$. Thus for the voltage $V_M$ we have:

$$V_M = \frac{V_B R_K + V_I R_3}{R_3 + R_K} \quad (2)$$

When the temperature $T_K$ in the room in which the resistor $R_K$ is disposed decreases, the resistance value of $R_K$ increases. Since it has been assumed hereinbefore that this must involve a decrease of the voltage $V_M$, with fixed values of $V_B$ and $V_I$, $V_M$ as a function of $R_K$ must be a falling function. The fact that this is a falling function will now be proved.

Differentiating the voltage $V_M$ with respect to $R_K$ we have $$\frac{dV_M}{dR_K} = \frac{R_3(V_B-V_I)}{(R_3+R_K)^2} \quad (3)$$

The function of Formula 2 is a decreasing function if $$\frac{dV_M}{dR_K} < 0 \quad (4)$$

and according to Formula 3 this is satisfied if $$V_B < V_I \quad (5)$$

In other words, when the voltage $V_I$ exceeds the voltage $V_B$, the voltage $V_M$ falls off with decreasing room temperature. This condition can always be satisfied because in operative heating systems the resistance value of $R_I$ is smaller than the resistance value of $R_B$ and hence with equality of the resistors $R_1$ and $R_2$ the voltage $V_I$ is greater than the voltage $V_B$.

Hence if with falling room temperature the voltage $V_M$ decreases, the switch in the regulating member M can be closed so that the heating system is switched on and consequently the voltage $V_I$ increases until the switch is opened again.

Figures 2, 3:
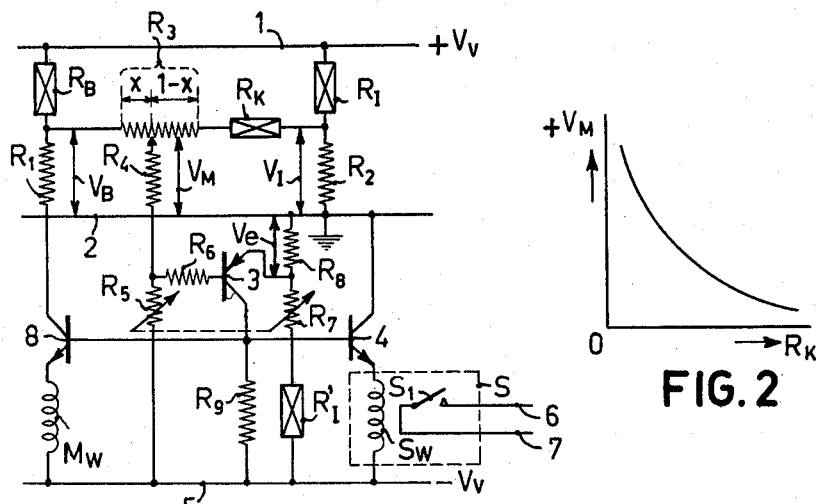
FIGURE 2 shows a curve representing the voltage $V_M$ taken from the bridge arrangement as a function of the N.T.C. resistor $R_K$ disposed in the heated enclosure.
FIGURE 3 shows another embodiment of the bridge arrangement shown in FIGURE 1 in which the regulating member M is constituted by two transistors with associated circuit elements.

For the bridge circuit shown in FIGURE 1 the variation of the voltage $V_M$ as a function of $R_K$ is shown in FIGURE 2.

Thus by this bridge circuit the inertia of the bimetal element is entirely eliminated and the inertia of the air in the enclosure to be heated is partially eliminated. Furthermore, the device measures not only the atmospheric temperature but also the temperature within the enclosure so that the inhabitant of the house has only to set the regulating member M to the desired temperature $T_K$, further regulation being automatic.

By the provision in accordance with the invention of the diagonal arm comprising the series combination of the resistors $R_3$ and $R_K$ and by taking the voltage $V_M$ for the regulating member M from the variable tapping on $R_3$ and the grounded conductor 2, an amplifying element may simply be included in the regulating member enabling the sensitivity of the regulation to be increased and further compensations to be obtained.

The arrangement discussed will now be described in detail with reference to further embodiments shown in FIGURES 3 and 4.

In the embodiment shown in FIGURE 3 the regulating member M comprises transistors 3, 4 and 8, a relay S and the required resistors.

A positive supply voltage of $+V_V$ volts is applied to the conductor 1 and hence the voltage $V_M$ also is a positive voltage depending upon the temperatures $T_I$ and $T_B$. Owing to the provision of the resistor $R_K$ the voltage $V_M$ will also be dependent upon the temperature $T_K$. As has been proved hereinbefore, with fixed values of $V_B$ and $V_I$ the voltage $V_M$ as a function of the resistor $R_K$ is a decreasing function so that with decreasing temperature $T_K$ (with resulting increase of the resistance value of $R_K$) the positive voltage $V_M$ decreases.

The voltage $V_M$ is used to cause a base current $i_b$ to traverse a first transistor 3. The transistor 3 must be controlled so that when a particular value of the room temperature $T_K$, which may be adjusted in a manner described hereinafter, is reached, the current passing through a second transistor 4 which is controlled by the first transistor 3 reaches a value such that a relay contact $S_1$, which is the switch of the regulating member M, releases. This means that with increase in the temperature $T_K$ due to increase of the temperature $T_I$ of the water in the boiler the current traversing a relay winding $S_W$, which together with the relay contact $S_1$ forms the relay S and is connected in the emitter circuit of the second transistor 4, must be reduced to the so-called release current at which the relay contact $S_1$ releases. In this case the relay S is a so-called make-contact relay in which the current traversing the winding $S_W$ has to exceed a given value for the contact $S_1$ to be and remain closed until the current decreases to a value smaller than the release current at which the contact $S_1$ is opened. In the arrangement shown in FIGURE 3 this is ensured by designing the transistor 3 as a pnp-transistor and applying to the base of this transistor a negative bias voltage derived from a second direct voltage $-V_v$ applied between the conductors 5 and 2. The negative voltage $-V_v$ is also used as a supply voltage for the transistors.

A voltage divider comprising resistors $R_4$ and $R_5$ is connected between the variable tapping on the resistor $R_3$ and a conductor 5 to produce the negative bias voltage for the transistor 3 and to couple it to the positive voltage $V_M$. The junction of the resistors $R_4$ and $R_5$ is connected through a limiting resistor $R_6$ to the base of the transistor 3. If the resistors $R_4$ and $R_5$ are sufficiently large, then $R_6$ may be omitted.

The collector of the transistor 3 is connected through a resistor $R_9$ to the conductor 5. A second voltage divider comprising a resistor $R'_I$ having a positive temperature coefficient and fixed resistors $R_7$ and $R_8$ is connected between conductors 5 and 2. The emitter of the transistor 3 is connected to the junction of resistors $R_7$ and $R_8$. The resistor $R'_I$ is preferably dependent upon the same temperature $T_I$ as the resistor $R_I$ and on variation of this temperature influences the emitter voltage $V_e$. The voltage $V_e$ is produced across the resistor $R_8$ and acts as a negative feedback voltage for the transistor 3, as will be described more fully hereinafter. This negative feedback enables the difference in temperature of the heated enclosure owing to the presence or absence of wind outside this enclosure to be compensated as far as possible. In the embodiment under consideration the transistor 4 is a npn-transistor and its base is connected to the collector of the transistor 3, the emitter current of the transistor 4 being passed through the relay winding $S_W$. Thus the transistor 3 controls the current passing through this relay winding. In the embodiment shown in FIGURE 3 two transistors are used to ensure that in spite of the negative feedback the required current amplification is obtained. A high current amplification is necessary to ensure that when the required current flows through the winding $S_W$, the current which passes through the potentiometer $R_4$, $R_5$, from which the control current for the transistor 3 is derived, is not excessive, for hereinbefore it was stipulated that the current flowing through the diagonal arm should be small compared with the currents flowing through the two main arms. Consequently, the current through $R_4$ and $R_5$ which has to be supplied through the diagonal arm must also be small with respect to the currents through the said main arms.

However, if the required current amplification is obtainable with the aid of a single transistor, the transistor 4 may be omitted and the resistor $R_9$ is replaced by the winding $S_W$.

The arrangement shown in FIGURE 3 operates as follows. At a given atmospheric temperature $T_B$ the water in the boiler must assume a temperature $T_I$ to bring the enclosure to be heated to the desired temperature $T_K$. This temperature can be set with the aid of the resistor $R_5$ which is variable. The base voltage $V_b$ of transistor 3 may be written with a certain approximation $$V_b = \frac{V_M R_5 - V_v R_4}{R_4 + R_5} \qquad (6)$$

Starting from a desired temperature $T_K$ the resistor $R_5$ is set to a certain value at which $V_b$ assumes a value determining the release current through the winding $S_W$ opening the contact $S_1$, for at a low temperature $T_I$ the resistor $R_I$ assumes a large value and hence $V_I$ a small value. It has been proved hereinbefore than $V_B < V_I$ and as $V_I$ is assumed to be small, $V_B$ and hence the positive voltage $V_M$ are also small. Assuming the emitter voltage $V_e$ to be zero, the negative base voltage $V_b$ will ensure that the transistor 3 passes a large collector current so that the emitter current of the transistor 4 also assumes a large value and the contact $S_1$ is closed. This contact is connected through conductors 6 and 7 to the apparatus to be switched on and off which renders the central heating system operative. Hence the water in the boiler is progressively heated so that the temperature $T_I$ rises. As a result the resistance value of $R_I$ decreases and the voltages $V_I$ and $V_M$ increase. Consequently, $V_b$ becomes steadily less negative so that the current through the winding $S_W$ decreases until the release current is reached and the contact $S_1$ is opened, rendering the central heating system inoperative.

With a lower atmospheric temperature $T_B$, $R_B$ is accordingly higher and $V_B$ lower. Hence $V_I$ must be increased to a higher value to obtain the value of $V_b$ required for the release current. The resistor $R_K$ is also significant, for the positive voltage $V_M$ increases with decrease of $R_K$, as may be seen in FIGURE 2. $R_K$ decreases with increase of $T_K$ so that with increase of $T_K$ the voltage $V_M$ is increased and hence the heating system is switched off in a manner similar to that described with respect to an increase in the temperature $T_I$.

The room temperature $T_K$ may be set to another value with the aid of $R_5$. However, $V_b$ must be maintained at the same value since the value of the release current through the winding $S_W$ must remain the same. Therefore when a lower room temperature $T_K$ is to be set, the temperature $T_I$ will have to be increased to a lesser extent. A lower $T_I$ corresponds to a higher value of $R_I$ so that at this new setting a lower $V_I$ and a lower $V_M$ have to be taken into account. The lower temperature $T_K$ involves a higher value of $R_K$ and hence $V_M$ will decrease further, as is shown in FIGURE 2. If the Formula 6 is written:

$$(V_b + V_v) R_4 = (V_M - V_b) R_5 \qquad (7)$$

it follows from this Formula 7 that, if $V_b$ is to remain constant with decreasing $V_M$, the resistor $R_5$ must be increased. In other words, to set a lower temperature $T_K$ the variable resistor $R_5$ must be increased. Obviously to obtain a higher temperature $T_K$ the resistor $R_5$ has to be decreased.

The mechanism by means of which the variable resistor $R_5$ is adjusted may also cause a pointer to move over a temperature scale which may be calibrated in degrees Celsius, enabling the person operating the system to read the temperature to be set. If required, a normal thermometer (for example a mercury thermometer) may be added, permitting a comparison with the real room temperature.

Obviously the temperature setting may also be carried out by means of the resistor $R_4$. In this case the resistor $R_4$ must be variable and its resistance variations must be opposite to those described with respect to the resistor $R_5$.

For convenience the emitter voltage $V_e$ has been assumed to be zero hereinbefore. In actual fact $V_e \neq 0$ so that the emitter of the transistor 3 is at a negative potential with respect to the conductor 2. Hence, when the voltage $V_b$ is negative with respect to the conductor 2 the resulting negative voltage set up between the base and the emitter of the transistor 3 is decreased by the presence of the voltage $V_e$. This must be allowed for in calibrating the temperature scale associated with the resistor $R_5$. The variable tapping on the resistor $R_3$ serves to compensate for differences between different central heating systems.

When the desired room temperature has been set with the aid of the resistor $R_5$ there may be a difference between the temperature $T_K$ in a period of strong wind and that in a calm. When a strong wind is blowing outside the heated enclosure the enclosure is cooled more intensely than in a calm. Hence, in the former case the enclosure has to be heated more intensely, which requires a higher temperature $T_I$ of the water in the boiler. When the wind decreases the temperature $T_K$ may be maintained constant with a lower boiler temperature $T_I$. When $T_I$ is decreased the resistance value of the resistor $R_I$ increases and hence $V_I$ decreases. Since the atmospheric temperature $T_B$ as such is not changed, $V_B$ also remains substantially constant and if it is initially asumed that $T_K$ also is not changed it follows that $V_M$ has to decrease owing to the decrease of $V_I$. If the voltage $V_e$ is neglected for the time being, it follows that at the same room temperature $T_K$ the release current through the winding $S_W$ is not reached. The temperature $T_I$ of the water in the boiler consequently increases further than is necessary in a calm to reach a room temperature $T_K$ which had been set at a period of strong wind. When $T_I$ is increased slightly further, $R_I$ is slightly decreased and hence $V_I$ is slightly increased and owing to the increase of $T_I$, $T_K$ will rise to exceed the value adjusted in a period of strong wind. Due to the increase of $T_K$, $R_K$ decreases so that according to the characteristic curve shown in FIGURE 2 the voltage $V_M$ will be slightly increased. The increase of $V_I$ and the decrease of $R_K$ result in a double increase of $V_M$ so that the release current is reached with a comparatively small increase of $T_K$ relative to the value set in a period of strong wind.

That this increase may be further reduced by the negative feedback voltage $V_e$ will now be explained. Owing to the lower $T_I$ in a calm, $R'_I$ also has decreased and hence $V_e$ has increased. Since $V_e$ is negative with respect to the conductor 2, the release current now is reached sooner than without the provision of the resistor $R'_I$. However, because the resistor $R_5$ is variable to enable various room temperatures $T_K$ to be set, the potentiometer comprising the resistors $R'_I$, $R_7$ and $R_8$ also must be variable to enable the voltage $V_e$ to be set in accordance with a given setting of $V_M$. As has been proved hereinbefore, $R_5$ has to be increased to set a lower $T_K$. This involves a lower $T_I$ and a lower $R'_I$. Since, however, $V_b$ is maintained constant, the value of $V_e$ must also remain constant with this new setting. $V_e$ is given by $$V_e = \frac{R_8}{R_7 + R_8 + R'_I}(-V_v) \quad (8)$$

An increased $R_5$ involves a lower $R'_I$ and hence $R_7$ must be increased to maintain the denominator of the Formula 8 and hence $V_e$ at the same value. By coupling $R_5$ and $R_7$ mechanically they can be operated simultaneously, permitting the voltages $V_b$ and $V_e$ to be set for any desired room temperature $T_K$. The adjustment of the voltages $V_b$ and $V_e$ may obviously be such that the resulting voltage $V_b - V_e$ set up between the base and the emitter of the transistor 3 is independent of the temperature $T_I$. It would appear that in this case the resistors $R_I$ and $R'_I$ may as well be omitted. The resistor $R_I$, however, is provided for the special purpose to prevent the boiler temperature from exceeding a safe value. Hence, the negative feedback by means of the voltage $V_e$ must be adjusted so that a difference in the strength of the wind involves a minimum difference in the room temperature $T_K$ whilst retaining the protective function.

The negative feedback may alternatively be provided by interchanging the resistors $R'_I$ and $R_8$ and using a N.T.C.-resistor for $R'_I$.

The arrangement shown in FIGURE 3 requires two voltage sources, one for supplying a positive voltage $V_v$ and the other for supplying a negative voltage $-V_v$. This disadvantage can be obviated with the aid of an arrangement as shown in FIGURE 4. In this arrangement a negative voltage of $-V_v$ volts is applied to the conductor 1 so that this conductor is negative with respect to the conductor 2. Further the resistors $R_B$ and $R_1$ and the resistors $R_I$ and $R_2$ are interchanged with respect to their connections to the conductors 1 and 2. Thus the negative voltage $-V_M$ between the variable tapping on the resistor $R_3$ and the conductor 2, with fixed values of $V_B$ and $V_I$, as a function of $R_K$ is an increasing function, as is shown in FIGURE 5.

The voltage $-V_b$ at the junction of the resistors $R_4$ and $R_5$ is applied through the resistor $R_6$ to the base of the transistor 3 which is connected between the conductors 1 and 2 in a manner similar to its connection between the conductors 2 and 5 in FIGURE 3. The same applies to the transistor 4.

Figure 4:
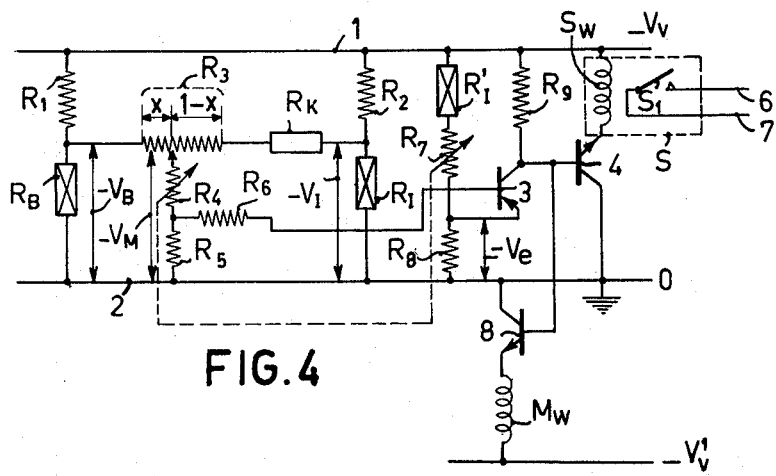
FIGURE 4 is a further improvement upon the embodiment shown in FIGURE 3 in which only one supply voltage for the transistors is required.
Figure 5:
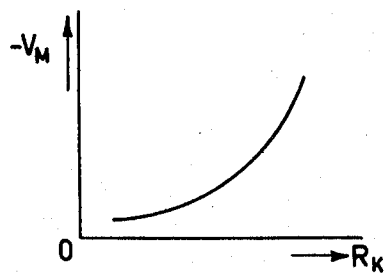
FIGURE 5 shows a curve representing the voltage $V_M$ taken from the bridge circuit shown in FIGURE 3 as a function of the N.T.C. resistor $R_K$ disposed in the heated enclosure.

The arrangement shown in FIGURE 4 operates similarly to that shown in FIGURE 1. When the boiler temperature $T_I$ rises, $R_I$ and hence the voltage $-V_I$ are decreased. As a result the voltage $-V_M$ also falls off and the currents passing through the transistors 3 and 4 are reduced until the release current for the winding $S_W$ is reached. With fixed values of $-V_I$ and $-V_B$, with rising room temperature $T_K$ the resistance value of the resistor $R_K$ and hence the voltage $-V_M$ are decreased so that the currents passing through the transistors 3 and 4 are again reduced until the release current is reached.

In a manner similar to that used with respect to the arrangement shown in FIGURE 3 it can be proved that a reduction of $R_4$ enables the temperature $T_K$ to be set to a higher value and an increase of this resistor enables the temperature $T_K$ to be set to a lower value, and further that the resistor $R'_I$ must have a positive temperature coefficient and that the resistors $R_4$ and $R_7$ must be coupled to one another mechanically to enable the voltage $-V_e$ to follow the voltage $-V_b$ when the temperature $T_K$ is set.

Obviously the resistors $R_8$ and $R'_I$ may be interchanged here also, in which case the resistor $R'_I$ must be a N.T.C.-resistor.

The transistor 3 may alternatively be a npn-transistor and the transistor 4 may be a pnp-transistor. In this event the polarity of the supply voltage must be reversed both in the arrangements of FIGURE 3 and in that of FIGURE 4.

Switching on and switching off the heating system may obviously be combined with continuous regulation. In coal-burning central heating systems blowers are provided which are switched on or off according to whether the fire is to be fanned or not. There are also continuous regulating systems in which a valve controlling the inlet port through which air is supplied to the fire is opened to a greater or lesser extent according to whether the fire has to be fanned or damped.

This continuous regulation may be simply effected with the aid of a device in accordance with the invention. For this purpose an additional winding $M_W$ is connected in the emitter circuit of a transistor 8. The winding $M_W$ may form part of an electromagnet adapted to move the valve against a spring force. When the temperature $T_I$ is low a large current passes through the winding $M_W$ and the inlet is opened wide. With decrease in $T_I$ the current through the winding $M_W$ decreases and the air inlet aperture is reduced. With decrease in $T_I$ the opposite effect occurs.

In the arrangements shown in FIGURES 3 and 4 the continuous regulation by means of the winding $M_W$ is combined with the device switching the blower motor on and off through the relay contact $S_1$. If desired, continuous regulation may be provided without the blower motor control.

Alternatively there may be continuous regulation of the amount of air supplied by the blower instead of regulation of the inlet. This may be effected by using a direct-current shunt motor for the blower and using the winding $M_W$ as the shunt winding of this motor. The direct current for the armature of the motor may in this case be directly taken from a separate direct-voltage source.

As a rule, however, an alternating current motor is preferably used because it may be directly connected to the alternating-current supply. In this case a transformer may be used having a primary winding constituted by the winding $M_W$ and having a secondary winding connected in series with the armature of an alternating current motor. By varying the permeability of the iron of the transformer with the aid of the varying direct current flowing through the winding $M_W$ the impedance connected in series with the armature and hence the current passed through this armature are varied. Thus, the speed of the blower motor can be controlled.

If the current amplification provided by the transistor 8 should be insufficient, a further transistor may be included.

The relay S may alternatively be a normally closed relay. In this case with increase in the temperature $T_K$ and consequently with increase in the temperature $T_I$ the current through the transistor 4 must increase. This may be achieved, for example, by interchanging in the arrangement of FIGURE 3 the resistors $R_1$ and $R_B$ and the resistors $R_2$ and $R_I$ and using a N.T.C.-resistor for the resistor $R'_I$.

Further, amplifier tubes may be substituted for the transistors. In this event, however, filament currents have to be supplied and furthermore the supply voltages for the other electrodes of the tubes usually are higher than the supply voltages required by transistors. As the arrangement is frequently manipulated for setting the desired temperature $T_K$, a low supply voltage is to be preferred because in this case any accidental direct contact of the operator with live parts is not harmful. For these reasons transistors are to be preferred as amplifier elements.

Although hereinbefore bridge circuits have been described in which the resistors $R_B$, $R_I$ and $R_K$ have negative temperature coefficients, these resistors may also have positive temperature coefficients (P.T.C.-resistors). In this event in the arrangements shown in FIGURES 3 and 4 the relays has to be a normally closed relay and the continuous regulation with the air of the winding $M_W$ must be such that with increase in the current through this winding the fire is damped. Further the resistors $R_3$ and $R_K$ must be interchanged and the resistor $R'_I$ must have a negative temperature coefficient.

The use of a resistor having a positive temperature coefficient for the resistor $R_I$ offers further advantages.

Figure 6:
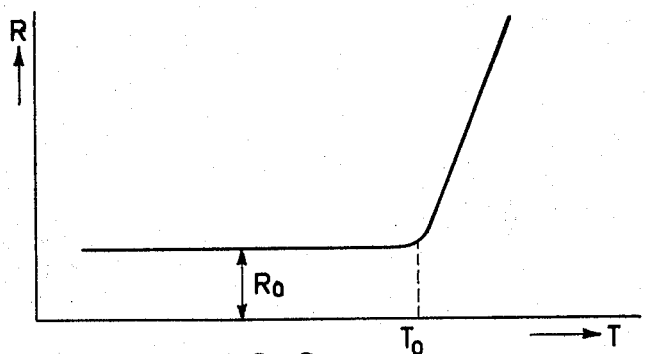
FIGURE 6 shows a curve representing the variation in resistance value of a resistor R having a positive temperature coefficient as a function of the temperature T.

The resistor $R_I$ is substantially provided for purposes of protection. As has been proved hereinbefore, the resistor $R_I$ adversely affects the regulation with respect to the strength of the wind outside the heated enclosure. Preferably the bridge circuit should be such that the regulation is substantially independent of the temperature $T_I$ and yet from a predetermined temperature the protection sets in and prevents the temperature $T_I$ of the water in the boiler from being excessively raised. There are resistors having a positive temperature coefficient the resistance value R of which varies as a function of the temperature T in the manner shown in FIGURE 6. Resistors of this type are described in British Patent No. 714,965, published September 8, 1954, and entitled, "Improvements in or Relating to Semi-Conductive Material." In contradistinction to the normal case in which the resistance value R is in a continuous way dependent upon, if not in linear relationship with, the temperature T, the curve of FIGURE 6 shows a discontinuous dependence. With increase in the temperature T the resistance value R remains at a substantially constant value $R_0$ until a temperature $T_0$ is reached whereupon the resistance value R increases. This increase is greater in proportion as the temperature $T_0$ is higher. By using as the resistor $R_I$ a resistor having a resistance variation as shown in FIGURE 6 the regulation of the temperature $T_K$ is substantially independent of the temperature $T_I$ of the water in the boiler until $T_I > T_0$. The value of $T_0$ may be chosen higher or lower. If may for example be 60° C. or 80° C. From this it follows that the regulation is independent of the temperature $T_I$ until this temperature exceeds a value of 60° C. or 80° C. respectively. Fortunately, when $T_I > T_0$ the resistance value of the resistor $R_I$ increases at a higher rate with $T_0 = 80°$ C. than with $T_0 = 60°$ C. Consequently in the former case protection sets in at a later instant but its action is quicker.

Figure 7:
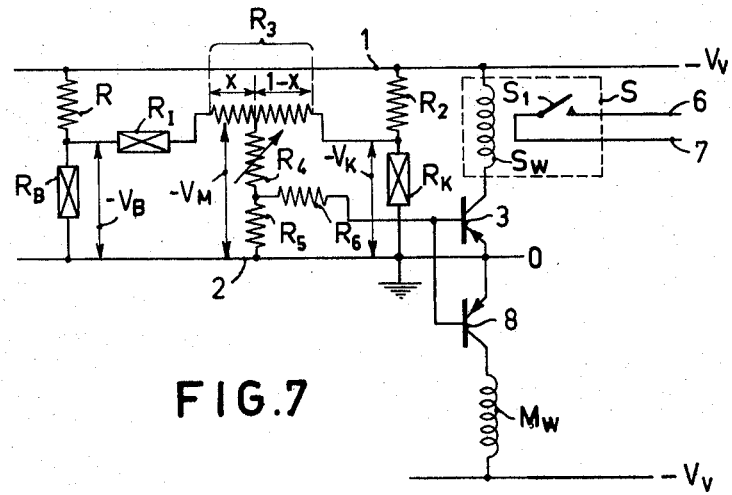
FIGURE 7 is a circuit diagram of a bridge arrangement including three resistors having positive temperature coefficients (P.T.C. resistors).

Obviously allowance must be made for the fact that the voltage $V_M$ is a decreasing or an increasing function of $R_K$ according to whether an arrangement as shown in FIGURE 3 or an arrangement as shown in FIGURE 4 is used and according to whether the relay S is a normally open relay or a normally closed relay. Similarly to what has been proved with respect to the bridge circuit shown in FIGURE 1 with the aid of Formulas 3 to 5 for N.T.C.-resistors $R_B$, $R_I$ and $R_K$, it may be proved for P.T.C.-resistors that the voltages $V_B$ and $V_I$ have to be in a given relationship. This relationship may always be satisfied by choosing the resistance value of the resistor $R_2$ correctly with respect to the resistance value $R_0$ assumed by the resistor $R_I$ before the temperature $T_I$ has reached the value $T_0$. Alternatively, however, a bridge circuit may be used in which the resistor $R_I$ is connected in the diagonal arm and the resistor $R_K$ in one of the main arms, as is shown in FIGURE 7. In this bridge circuit the resistors $R_B$, $R_I$ and $R_K$ are P.T.C.-resistors and the relay S is a normally closed relay. The resistance values of the resistors $R_B$ and $R_K$ increase continuously with increase in the temperatures $T_B$ and $T_K$ respectively. The resistor $R_I$ has a characteristic curve as shown in FIGURE 6. The operation of the entire arrangement shown in FIGURE 7 will be clear after the preceding discussion. It remains to discuss the omission of the potentiometer comprising the resistors $R_7$, $R_8$ and $R'_I$ and of the transistor 4.

The omission of the said potentiometer follows from the fact that in the regulating process the temperature $T_I$ below the value $T_0$ is insignificant, permitting the compensation for strong wind or calm to be also omitted. The omission of the negative-feedback voltage $V_e$ permits an increase in the amplification of the stage comprising the transistor 3 so that no additional amplification for the relay S with the aid of the transistor 4 is required. The voltage $-V_M$ may be written:

$$-V_M = \frac{R_3(1-x) \cdot (-V_B) + (R_3 \cdot x + R_I)(-V_K)}{R_3 + R_I} \quad (9)$$

As has been proved hereinbefore the resistor $R_I$ only commences to influence the voltage $-V_M$ when the temperature $T_I$ exceeds the value $T_0$. To prove that in this case also the protective action is satisfactory the Formula 9 similarly to the Formula 1 is written for a value $x=0$. This facilitates but does not further affect the following calculation and, with omission of the minus sign, results in:

$$V_M = \frac{V_B \cdot R_3 + R_I V_K}{R_3 + R_I} \quad (10)$$

Differentiation of Formula 10 with respect to $R_I$ gives:

$$\frac{dV_M}{dR_I} = \frac{(V_K - V_B) R_3}{(R_3 + R_I)^2} \quad (11)$$

The relay S now is a rest-contact relay so that for the contact $S_1$ to be opened the current flowing through the winding $S_W$ must be increased to exceed a predetermined value. From this it follows that the negative voltage $-V_M$ has to be increased for the collector current of the transistor 3 and hence the current through $S_W$ to be increased. In other words, the voltage $-V_M$ as a function of the resistor $R_I$ must be an increasing function. From Formula 11 it can be deduced that $$\frac{dV_M}{dR_I} > 0 \tag{12}$$

and this is the case if:

$$V_K > V_B \tag{13}$$

Since $T_K > T_B$, we also have $R_K > R_B$ and with reference to FIGURE 7 it will be appreciated that the Formula 13 is satisfied. If desired, the resistors $R_B$, $R_I$ and $R_K$ may be replaced by a combination of N.T.C.- and P.T.C.-resistors.

What is claimed is:

1. Apparatus for producing a control signal for regulating the temperature of an enclosure throughout a given temperature range, said enclosure being heated by means of a heating system, comprising a pair of supply voltage conductors, a bridge circuit comprising first and second branches connected across said conductors, each of said first and second branches comprising a first temperature responsive impedance element and a second impedance element connected in series to form a junction point, a diagonal branch circuit interconnecting the junction points of said first and second branches and comprising the series connection of a third temperature responsive impedance element and a fourth impedance element, the ratio of the impedances in said first branch circuit being related to the ratio of the impedances in said second branch circuit so as to maintain said bridge circuit unbalanced throughout said given temperature range, one of said temperature responsive elements being adapted to be positioned external to said enclosure thereby to undergo variations as determined by the temperature variations external to said enclosure, another of said temperature responsive elements being adapted to be positioned to respond to temperature variations within the enclosure, and another of said temperature responsive elements being adapted to be positioned to respond to temperature variations of said heating system, and output means connected between a point on said diagonal branch circuit and one of said supply conductors for deriving said control signal.

2. Apparatus for producing a control signal for regulating the temperature of an enclosure heated by means of a heating system, comprising a pair of supply voltage conductors, a bridge circuit comprising first and second branches connected across said supply conductors and each of which comprise a first temperature-dependent impedance element and a second impedance element connected in series to form a junction point, one end of each of said temperature-dependent elements being connected to the same supply conductor, a diagonal branch circuit comprising the series combination of a third temperature-dependent impedance element and a fourth impedance element connected between the junction points of said first and second branches, one of said temperature-dependent elements being adapted to be positioned external to said enclosure thereby to undergo impedance variations as determined by the temperature variations external to said enclosure, another of said temperature-dependent elements being adapted to be positioned to respond to the temperature variations within said enclosure, and another of said temperature-dependent elements being adapted to be positioned to respond to the temperature variations of said heating system, and means connected to said diagonal branch circuit for deriving said control signal.

3. Apparatus as described in claim 2 wherein each of said temperature-dependent impedance elements comprises an element having a negative temperature coefficient of resistance.

4. Apparatus as described in claim 2 wherein said temperature-dependent element in said first branch is adapted to respond to variations in the outside temperature and said second branch temperature-dependent element is adapted to respond to variations in the temperature of said heating system, and wherein the temperature-dependent element of said diagonal branch is adapted to respond to variations in the temperature inside said enclosure.

5. Apparatus as described in claim 4 wherein each of said temperature-dependent elements comprises a resistance element having a negative temperature coefficient throughout the entire range in which its associated temperatures may vary, said diagonal branch temperature-dependent resistance element having one end connected to said junction of said second branch which contains the temperature-dependent element which responds to variations in the heating system temperature.

6. Apparatus as described in claim 5 wherein one of said supply conductors is connected to a point of reference potential, and said diagonal branch fourth impedance element comprises a potentiometer having a variable tap, said control signal being derived between said potentiometer tap and said point of reference potential.

7. Apparatus for producing a control signal for regulating the temperature of an enclosure throughout a predetermined temperature range, said enclosure being heated by a heating system responsive to said control signal, said apparatus comprising a pair of supply voltage conductors, a bridge circuit comprising first and second branches connected across said supply conductors, each of said first and second branches comprising a first temperature-dependent resistance element and a second impedance element connected in series to form a junction point, one end of each of said temperature-dependent elements being connected to the same supply conductor, a diagonal branch circuit comprising the series combination of a third temperature-dependent resistance element and a fourth impedance element connected between the junction points of said first and second branches, the values of the various impedance elements of each of said first and second branches being chosen so that said bridge remains unbalanced throughout said predetermined temperature range, one of said temperature-dependent elements being adapted to be positioned external to said enclosure thereby to undergo impedance variations as determined by the temperature variations external to said enclosure, another of said temperature dependent elements being adapted to be positioned to respond to the temperature variations within said enclosure, and another of said temperature-dependent elements being adapted to be positioned to respond to the temperature variations of said heating system, and means for deriving said control signal between a point on said diagonal branch circuit and one of said supply conductors.

8. Apparatus as described in claim 7 wherein each of said temperature-dependent resistance elements comprises an element having a negative temperature coefficient of resistance, the resistance of said first branch temperature-dependent element being adapted to be responsive to variations in the outside temperature, the resistance of said second branch temperature-dependent element being adapted to be responsive to variations in the temperature of said heating system, and the resistance of said diagonal branch temperature-dependent element being adapted to be responsive to variations in the temperature inside said enclosure.

9. Apparatus as described in claim 8 wherein the elements of said first and second branches are chosen so that the voltage at the second branch junction remains higher than the voltage at the first branch junction throughout said predetermined temperature range.

10. Apparatus for producing a control signal for regulating the temperature of an enclosure throughout a predetermined temperature range, said enclosure being heated by a heating system responsive to said control signal, said apparatus comprising a pair of supply voltage conductors, a bridge circuit comprising first and second branches connected across said supply conductors, each of said first and second branches comprising a first temperature dependent impedance element and a second impedance element connected in series to form a junction point, one end of each of said temperature-dependent elements being connected to the same supply conductor, a diagonal branch circuit comprising the series combination of a third temperature-dependent impedance element and a fourth impedance element connected between the junction points of said first and second branches, one of said temperature-dependent elements being adapted to be positioned external to said enclosure thereby to undergo impedance variations as determined by the temperature variations external to said enclosure, another of said temperature-dependent elements being adapted to be positioned to respond to the temperature variations within said enclosure, and a third one of said temperature-dependent elements being adapted to be positioned to respond to the temperature variations of said heating system and exhibiting a positive temperature coefficient in which the resistance is substantially constant over a given temperature range and exhibits a rising positive characteristic above a predetermined temperature within said predetermined temperature range, and means connected to said diagonal branch circuit for deriving said control signal.

11. Apparatus as described in claim 10 wherein said third temperature-dependent element is connected in said diagonal branch of the bridge circuit.

12. Apparatus as described in claim 11 wherein said diagonal branch fourth impedance element comprises a potentiometer having a variable tap, said control signal being derived between said potentiometer tap and one of said supply conductors.

13. Apparatus as described in claim 11 wherein said temperature-dependent elements in said first and second branches comprise a resistance element having a positive temperature coefficient throughout said predetermined temperature range, one of said branch positive temperature coefficient resistances being adapted to be responsive to variations in said outside temperature, and said third temperature-dependent resistance element located in said diagonal branch has one end connected to the junction of the branch containing the said temperature-dependent resistance which is adapted to be responsive to the outside temperature.

14. Apparatus for regulating the temperature of an enclosure heated by a heating system, comprising a pair of supply voltage conductors, a bridge circuit comprising first and second branches connected across said supply conductors, each of said first and second branches comprising a first temperature-dependent impedance element and a second impedance element connected in series to form a junction point, a diagonal branch circuit comprising the series combination of a third temperature-dependent impedance element and a fourth impedance element connected between the junction points of said first and second branches, one of said temperature-dependent elements being adapted to be positioned external to said enclosure thereby to undergo impedance variations as determined by the temperature variations external to said enclosure, another of said temperature-dependent elements being adapted to be positioned to respond to the temperature variations within said enclosure, and another of said temperature-dependent elements being adapted to be positioned to respond to the temperature variations of said heating system, signal amplifying means having an input circuit and an output circuit, means connected to said diagonal branch circuit for deriving a control signal and supplying same to said input circuit, said output circuit including a feedback circuit for providing a negative feedback voltage to said amplifying means, said feedback circuit including a temperature-dependent resistance element adapted to be positioned to be responsive to the temperature variations of said heating system.

15. Apparatus as described of claim 14 wherein each of said bridge circuit temperature-dependent elements comprises a resistance element having a negative temperature coefficient of resistance and wherein said feedback circuit temperature-dependent element comprises a resistance element having a positive temperaure coefficient of resistance.

16. Apparatus as described in claim 14 wherein said temperature-dependent element in said first branch is adapted to respond to variations in the outside temperature and said second branch temperature dependent element is adapted to respond to variations in the temperature of said heating system, and wherein the temperature-dependent element of said diagonal branch is adapted to respond to variations in the temperature inside said enclosure, said amplifying means comprising first and second input electrodes to each of which is connected a separate potentiometer having a variable tap, and mechanical means for coupling the potentiometer taps together so that the adjustment of the control voltage between said input electrodes is substantially independent of the setting of said potentiometer taps.

References Cited by the Examiner

UNITED STATES PATENTS 2,573,661   10/51   Deubel _____ 236—9

FOREIGN PATENTS 573,028   8/44   Great Britain.

EDWARD J. MICHAEL, *Primary Examiner.*

ALDEN D. STEWART, *Examiner.*